Jan. 9, 1934. J. H. WELLER 1,942,525
REENFORCED MOLDED ARTICLE OF BUILDERS' HARDWARE
Filed Jan. 7, 1930
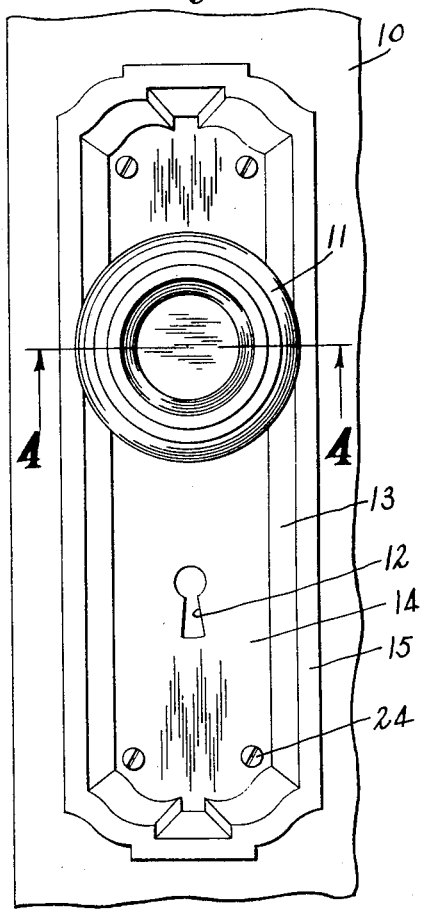
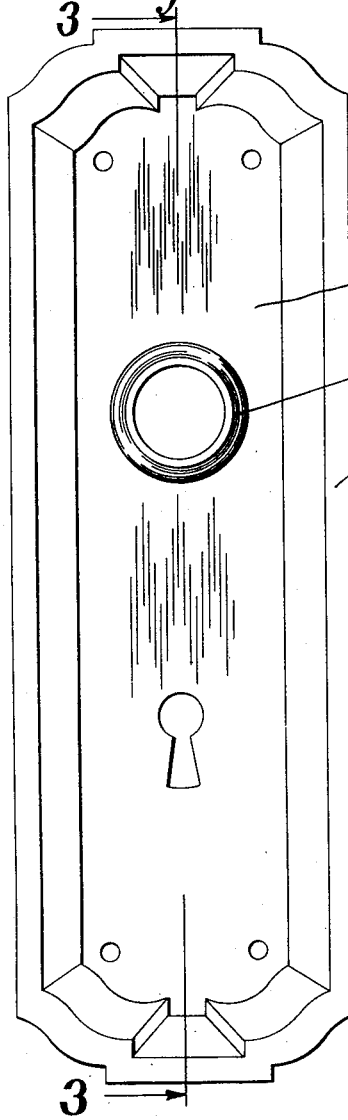
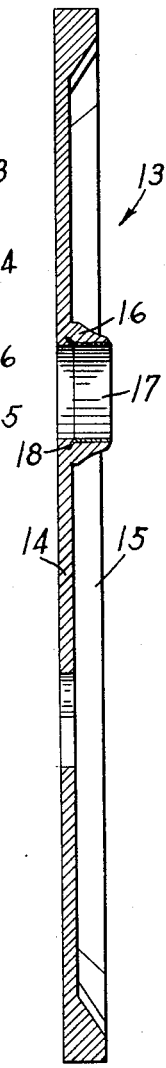
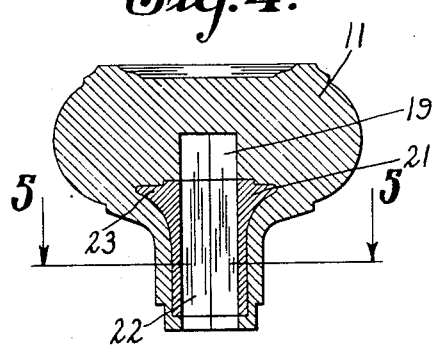
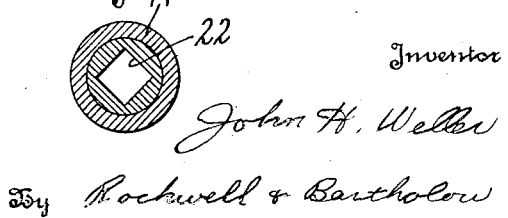

Patented Jan. 9, 1934

1,942,525

UNITED STATES PATENT OFFICE 1,942,525

REENFORCED MOLDED ARTICLE OF BUILDERS' HARDWARE

John H. Weller, New Haven, Conn., assignor to Sargent & Company, New Haven, Conn.

Application January 7, 1930. Serial No. 419,052

1 Claim. (Cl. 70—16)

My invention relates to improvements in reenforced molded articles of builders' hardware, and more especially to articles of this class molded out of bakelite, condensite, and similar products.

An object of the invention is to provide articles of builders' hardware which are molded substantially in final shape and in finished condition so that very little, if any, machine work is required.

Another object of the invention is to provide in articles of this class for the reenforcement of such parts as are subjected to wear or strains.

A still further object of the invention is to provide a form of reenforcing for a molded article of the class specified which may be introduced into the article during the molding process and in such shape that substantially no machine work or other operations are necessary upon the the article when removed from the mold.

To these and other ends, the invention consists in the novel features and combination of parts to be hereinafter described and claimed.

In the drawing,

Fig. 1 is a plan view of an escutcheon plate and door knob according to my invention;

Fig. 2 is a plan view of the escutcheon shown in Fig. 1, but on an enlarged scale;

Fig. 3 is a cross-sectional view along line 3—3 of Fig. 2;

Fig. 4 is a cross-sectional view along line 4—4 of Fig. 1; and

Fig. 5 is a cross-sectional view along line 5—5 of Fig. 4.

Referring to the drawing in which I have illustrated my invention by showing a preferred embodiment of the same, the reference numeral 10 indicates, in general, a fragmentary part of a door having mounted therein, as is usual (and which is not shown herein), a lock mechanism which may be controlled by a knob 11 and by means of a key inserted in the usual keyhole 12. Mounted on a face of door 10 is an escutcheon 13 which, in the present invention, is made of a moldable material such as bakelite, condensite, hard rubber, etc., the escutcheon being molded to shape and provided with a relatively thin flat central body part 14, a thickened edge or molding 15, and a hollow boss 16, in which the stem of knob 11 may be received.

Many of the materials suitable for forming escutcheons and similar articles of builders' hardware do not form good wearing surfaces and chip and crack very readily. For example, the opening through which the knob extends into the lock supports the knob and the escutcheon adjacent this opening is thus subjected to wear and strains incident to the operation of the lock.

According to the present invention the boss 16 of escutcheon 13 is reenforced by a metallic sleeve which protects the boss from direct contact with the knob 11, forms a suitable wearing surface, and prevents the edges of the boss from becoming chipped. In order that the sleeve 17 may be securely fastened or anchored in boss 16, sleeve 17 is provided with an outwardly turned edge or flange 18 which locks the sleeve 17 in boss 16. Preferably, sleeve 17 is inserted in the mold in which the escutcheon 13 is made, and the material of the escutcheon 13 flows around the outwardly turned edge 18 and outwardly around the sleeve 17 during the molding process to lock the sleeve 17 in the escutcheon 13 as the moldable material hardens, the boss adjacent the outwardly turned or flared end being of greater thickness than at the opposite end of the sleeve.

Knob 11 is likewise molded out of bakelite, condensite, or the like, and is provided with the usual square opening 19 for the reception of a stem (not shown). In order to strengthen the shank of knob 11, and to eliminate any possibility of the shank or knob body becoming cracked or otherwise broken, I have provided a reenforcement for the knob which, as illustrated, takes the form of sleeve 21. Sleeve 21 is provided with a square opening 22 which is aligned with the opening in the knob during the molding process. The inner end 23 of sleeve 21 is enlarged or flared outwardly to anchor the sleeve 21 in the knob, the material of the knob being molded about the sleeve and being of greater thickness adjacent the flared portion of the sleeve than adjacent the outer end thereof. The escutcheon plate 13 is mounted on door 10, as by means of screws 24, while knob 11 may be secured on its stem in any suitable manner, as for example in the usual manner in which a set screw (not shown) extends through the knob and bears against the stem.

It will be readily understood from the above description of my invention that I have provided an article of builders' hardware which may be readily formed by a molding process and in which the usual machine operations are reduced or completely eliminated, the metallic reenforcement strengthening such parts of the article as are subjected to wear and strains, and preventing the article from becoming damaged in use.

While I have shown and described a preferred embodiment of my invention, it will be understood that it is not to be limited to all the details shown, but is capable of modification and variation within the spirit of the invention and the scope of the appended claim.

What I claim is:

An article of builders' hardware made of a moldable material, said article having a body portion and a boss extending therefrom, said boss being provided with an opening which extends through the boss and into the body portion, said opening being of two diameters, the smaller end of which is in the body portion, and a hollow metallic sleeve molded in the boss to form an inner lining for the opening therein, the opening in said sleeve being of the same size as, and in alignment with, the smaller part of the opening in the article, whereby the opening in the sleeve and the smaller end of the opening in the article form a continuous opening of constant size.

JOHN H. WELLER.